United States Patent [19]
Lindsey et al.

[11] Patent Number: 5,743,556
[45] Date of Patent: Apr. 28, 1998

[54] INFLATOR FLOW INHIBITOR

[76] Inventors: David W. Lindsey, 1534 Shadow Valley Dr., Ogden, Utah 84403; Darrin L. Johnson, 16158 E. Glenbrook Blvd., Fountain Hills, Ariz. 85268

[21] Appl. No.: 832,427

[22] Filed: Apr. 2, 1997

[51] Int. Cl.⁶ .................................................. B60R 21/28
[52] U.S. Cl. ................................... 280/736; 280/741
[58] Field of Search ........................ 280/741, 736, 280/742; 222/3; 102/530, 531; 422/164

[56] References Cited

U.S. PATENT DOCUMENTS

| | | | |
|---|---|---|---|
| 4,938,501 | 7/1990 | Wipasuramonton | 280/743 |
| 5,100,170 | 3/1992 | Mihm et al. | 280/735 |
| 5,178,547 | 1/1993 | Bonas et al. | 439/34 |
| 5,427,030 | 6/1995 | Kidd et al. | 102/202 |
| 5,482,312 | 1/1996 | Maurer | 280/728.1 |
| 5,492,365 | 2/1996 | Bayley et al. | 280/741 |
| 5,492,366 | 2/1996 | Osborne et al. | 280/741 |
| 5,499,843 | 3/1996 | Faigle et al. | 280/741 |
| 5,525,306 | 6/1996 | Schmucker et al. | 422/165 |
| 5,531,475 | 7/1996 | Medarsky et al. | 280/741 |
| 5,542,704 | 8/1996 | Hamilton et al. | 280/741 |
| 5,636,865 | 6/1997 | Riley et al. | 280/741 |

FOREIGN PATENT DOCUMENTS

| | | | |
|---|---|---|---|
| 4129541 | 3/1992 | Germany | 280/736 |

*Primary Examiner*—Christopher P. Ellis

[57] ABSTRACT

An inflator of a vehicle safety restraint system having a flow inhibitor system which forces ignition gases through a gas generant of the inflator. A housing includes a gas generant chamber and an igniter for generating an ignition gas. A gas generant is disposed within the gas generant chamber for generating an inflation gas. A shock absorbing devive supports the gas generant in the housing. The shock absorber is disposed within a region of the gas generant chamber. A flow inhibitor blocks the flow of the ignition gas into the region of the shock absorber. The flow inhibitor is disposed adjacent the shock absorber, such that the ignition gas does not enter the region of the shock absorber but passes solely through the gas generant.

17 Claims, 2 Drawing Sheets

INFLATOR FLOW INHIBITOR

BACKGROUND OF THE INVENTION

1. Field of the Invention

The present invention relates to a flow inhibitor system for an inflator of a vehicle safety restraint system, and more particularly, to a flow inhibiting system which forces ignition gases to pass through the gas generant of the inflator for improved ignition.

2. Description of the Related Art

Numerous types of inflators have been disclosed in the prior art for expanding an inflatable air bag of a vehicle safety restraint system. One type of inflator utilizes a plurality of disk-shaped gas generant grains concentrically stacked within an ignition chamber and which generate a large quantity of gas that is released from the inflator to inflate the airbag.

One disadvantage with an inflator utilizing gas generant grains is the fragility of the stacked grains. In order to stabilize the grains relative to each other to protect the grains from being broken upon assembly, it is known to utilize a shock absorbing device. U.S. Pat. No. 5,499,843 utilizes a spring 244 which presses the grains of gas generant securely against an elastomeric pad 180 disposed in an opposite end of the inflator housing. Normally, if a spring or other shock absorbing device is provided in the inflator a space or region between the end of the housing and the generant occurs.

Current inflators do not restrict ignition gas flow into the empty region where the shock absorbing devices are placed. As shown in U.S. Pat. No. 5,499,843, a large area surrounding the shock absorbing device is empty and ignition gas from the igniter is free to enter this void. Typically, this results in a higher flow region than the gas which enters and passes between the gas generant grains. The effect is wasted ignition energy, non-uniform ignition of the gas generant and localized filter damage at the high flow areas.

Thus, the prior art requires additional material to provide the same amount of flow through the gas generant stack due to losses through the shock absorbing device. The present invention is designed to reduce or eliminate those losses.

SUMMARY OF THE INVENTION

An object of the present invention is to cure the deficiencies of the prior art by providing a flow inhibitor system for an inflator of a vehicle safety restraint system which inhibits gas flow from exiting the inflator without effectively transferring its energy to the gas generant.

Another object of the present invention is to provide a system which blocks gas flow into a spacer/shock absorption area of the generant stack.

A further object of the present invention is to force ignition gases through the gas generant causing improved ignition by reducing losses.

Still another object of the present invention is to provide a flow inhibitor system which stabilizes the gas generant stack during assembly and installation of the inflator.

Enhanced ignition performance can be achieved while providing the necessary load capacity adjustment and shock absorbing effects to prevent gas generant damage. Use of this flow restricting technique allows for the use of simple design shock absorbing devices.

In accomplishing these and other objectives of the present invention, there is provided an inflator of a vehicle safety restraint system having a flow inhibitor system which forces ignition gases through a gas generant of the inflator. A housing includes a gas generant chamber and means for generating an ignition gas located therein. A gas generant is disposed within the gas generant chamber for generating an inflation gas. Means support the gas generant within the housing. The supporting means are disposed within a region of the gas generant chamber. Means inhibit the flow of the ignition gas into the region of the supporting means. The inhibiting means is disposed adjacent the supporting means, such that the ignition gas does not enter the region of the supporting means but passes solely through the gas generant.

Other features and advantages of the present invention will become apparent from the following description of the invention which refers to the accompanying drawings.

DETAILED DESCRIPTION OF THE PREFERRED EMBODIMENTS

Figure 1:
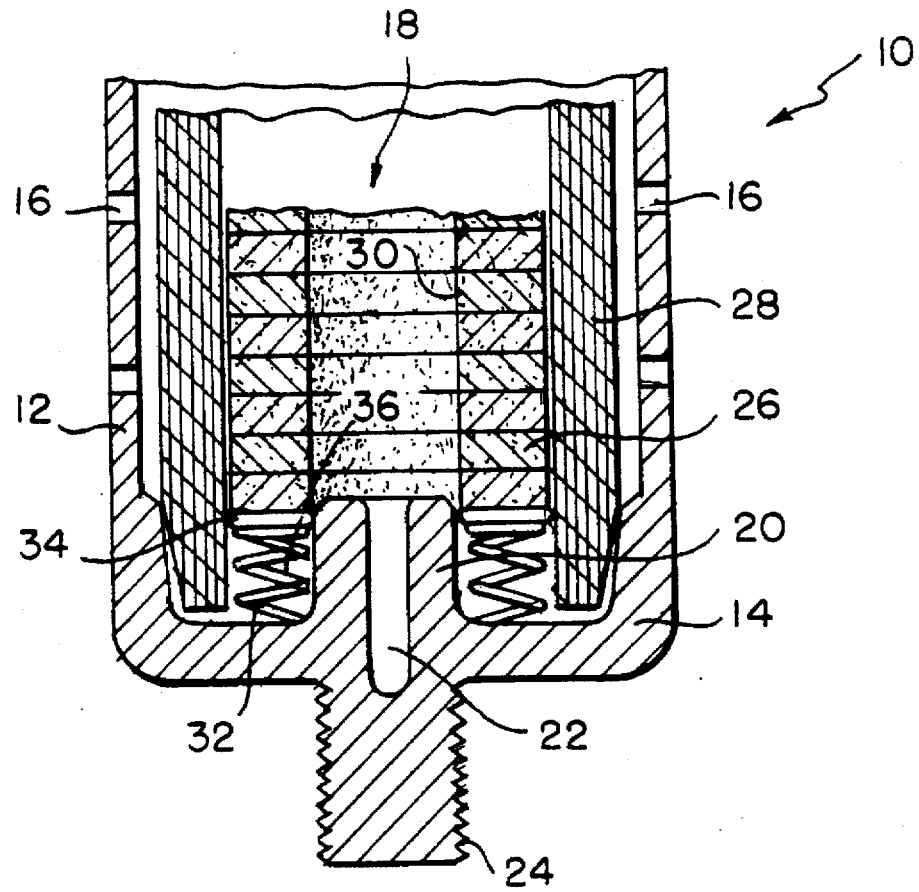
FIG. 1 is a partial cross-section of an inflator including the flow inhibiting system of the present invention.

Referring to FIG. 1, an inflator 10 includes a cylindrical shaped housing 12 having a closed end 14. Housing 12 is preferably made of a lightweight material such as aluminum. Housing 12 also includes a plurality of discharge openings 16 through which the generated gas passes to inflate an airbag (not shown).

Housing 12 defines an inner generant chamber 18. Closed end 14 includes a center post 20 which extends into chamber 18. Center post 20 can include a cavity 22 for containing a quantity of auto ignition material (not shown). Features can also be provided for centering and/or retaining linear ignition components.

End 14 further includes an attachment stud 24 extending perpendicularly therefrom, for aligning and mounting the inflator to other components of the airbag assembly. Features, for example, a thread to receive a nut or a flat blade which can be tabbed over a reaction canister end plate (not shown), can be machined on the attachment stud.

A gas generant material 26, made of a plurality of concentrically stacked disk-shaped grains is disposed in chamber 18. The gas generant, having any suitable composition known in the art, generates a large amount of inflation gas when ignited. During operation, an igniter (not shown) containing a pyrotechnic material generates an ignition gas which in turn ignites the gas generant.

The individual grains of the generant can include projections or pockets (not shown) to define spaces between the grains allowing passages for efficient flow of the ignition gas through and away from the grains.

A filter 28 is positioned between the housing and gas generant 26 such that the generated gases will pass through the filter prior to exiting the inflator through discharge openings 16.

Figure 2:
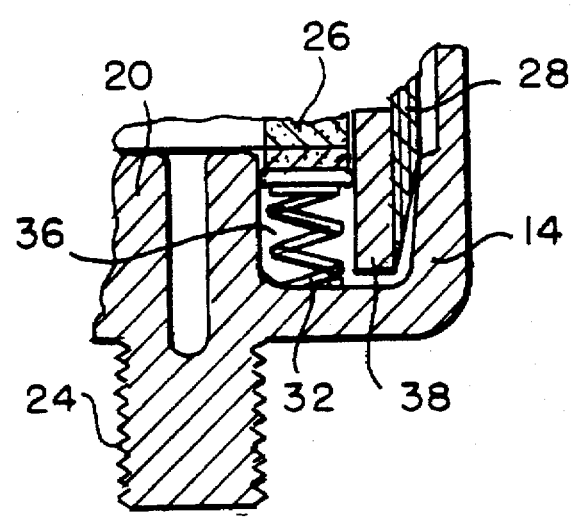
FIG. 2 is an enlarged partial cross-section of another embodiment of the flow inhibiting system of the present invention.

As shown in FIGS. 1 and 2, a flow restricting, adjustable height, shock absorbing means is provided. Each of the grains includes a central aperture 30 with center post 20 extending a small distance into the aperture 30 of at least the lower grain of the stack. The post fits closely into the grain.

A shock absorber 32, such as a spring or wire mesh type device, is placed beneath the gas generant 26 in a region 36 at end 14 of the housing. A washer 34 is disposed between the stack of generant and the shock absorber to provide uniform support of the stack. The washer is closely slid over center post 20 providing some flow restriction, which will be described further herein, as well as, uniform support for the gas generant stack against absorber 32 during handling and service life of the inflator in a vehicle. Washer 34 is preferably made of a high temperature resistant metal, however, a rubber grommet could also be used. For ease of assembly, an end of absorber 32 can be attached to washer 34.

The flow inhibitor system of the present invention utilizes center post 20. The close fit of the generant 26 and washer 34 to post 20 limits the flow of ignition gas into the region 36 occupied by the shock absorber 32. Thus, gas flow is restricted into passing through the gas generant stack 30 and not shock absorber 32. The ignition gas will then pass between the grains igniting them and producing a higher flow area. Moreover, as absorber 32 is compressed the gaps between the grains increase presenting easier flow paths for the ignition gas.

As shown in FIG. 2, an additional flow restriction barrier 38 can be disposed between shock absorber 32 and filter 28. Barrier 38 is made of a high temperature resistant material. The presence of barrier 38 further prevents any ignition gas from escaping into region 36 or between gas generant stack 30 and filter 28.

Figure 3:
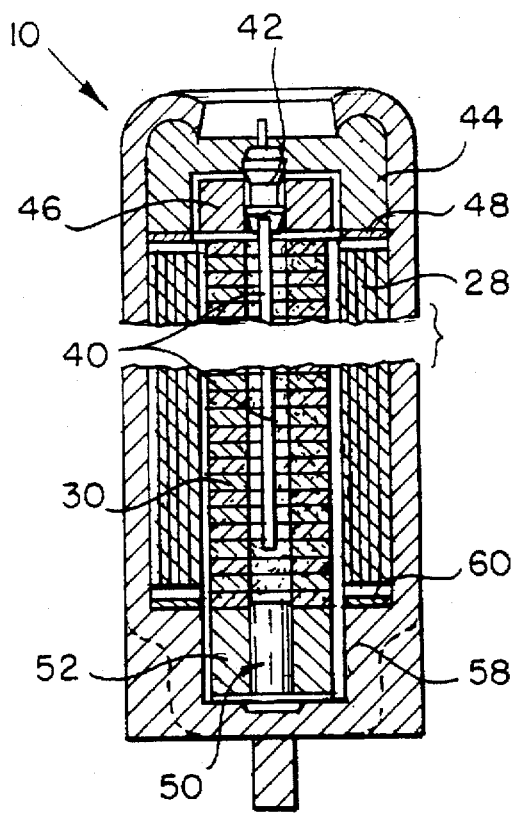
FIG. 3 is a cross-section of an inflator including a third embodiment of the flow inhibiting system of the present invention.
Figure 4:
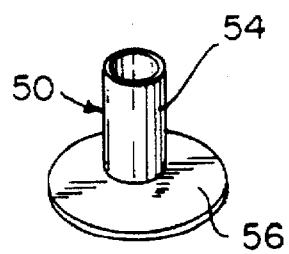
FIG. 4 is as perspective view of a flow inhibitor tube of FIG. 3.
Figure 5:
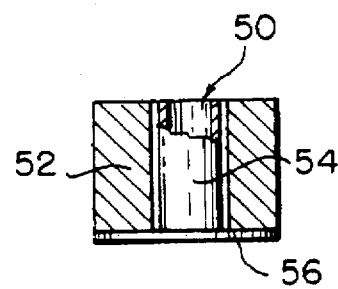
FIG. 5 is a cross-section of the flow inhibitor tube and spacer of FIG. 3.

FIGS. 3–5 illustrate another embodiment of the invention. The inflator 10 includes a linear igniter 40. A squib 42 is held within an extended base 44. An upper spacer 46 surrounds igniter 40 and squib 42 within the base 44. A top seal 48 is located between filter 28 and base 44. The inflator housing is stepped at 58 to provide a seat for filter 28. Because of extended base 44 and stepped end 58 the length of filter 28 can be shorter than concentional filters.

A flow inhibitor tube 50 is located in a closed end of the inflator. An alternate chamber profile is shown in FIG. 3 by dashed line. Tube 50 is made of a high temperature resistant material, for example, a metal. Tube 50 includes a hollow stem 54 into which an end of igniter 40 extends, see FIG. 4.

As shown in FIGS. 3 and 5, stem 54 of tube 50 is closely surrounded by a lower spacer 52. Spacer 52 rests on a flange 56 of tube 50 and supports stack 30. Tube 50 and spacer 52 are located in a closed end of the inflator. Spacer 52 can be made of a shock absorbent material to cushion the grains within the inflator. A lower seal 60 is disposed between filter 28 and spacer 52.

Tube 50 blocks the ignition gas from passing through spacer 52 into filter 28. Thus, gas flow passes through only the gas generant stack 30.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An inflator of a vehicle safety restraint system having a flow inhibitor system which forces ignition gases through a gas generant of the inflator, comprising:

a housing having a gas generant chamber;

means for generating an ignition gas located in the housing;

a gas generant disposed within the gas generant chamber for generating an inflation gas;

means for supporting the gas generant disposed in the housing, the supporting means being disposed within a region of the gas generant chamber; and means for inhibiting the flow of the ignition gas into the region of the supporting means, wherein the inhibiting means is disposed adjacent the supporting means, such that the ignition gas does not enter the region of the supporting means but passes solely through the gas generant.

2. The inflator of claim 1, wherein the gas generant comprises a stack of concentrically-stacked gas generant grains.

3. The inflator of claim 2, further comprising a center post formed integrally with one end of the housing and extending inwardly into the gas generant chamber.

4. The inflator of claim 3, wherein the center post includes a cavity containing a quantity of auto-ignition material.

5. The inflator of claim 3, wherein each of the gas generant grains include a central aperture, the center post of the housing extending into the aperture of at least one of the gas generant grains.

6. The inflator of claim 3, wherein the supporting means comprises a shock absorbing spring for supporting the stack of gas generant.

7. The inflator of claim 6, wherein the flow inhibiting means comprises a washer closely fitted about the center post and disposed between the stack of gas generant and the spring, wherein the ignition gas is prevented from flowing into the region of the spring by the washer.

8. The inflator of claim 7, wherein the washer is made of a high-temperature resistant material.

9. The inflator of claim 3, further comprising an attachment stud extending outwardly from an end of the housing, the attacment stud including means for aligning and mounting the inflator.

10. The inflator of claim 2, wherein the supporting means comprises a ring-shaped spacer disposed in one end of the housing for supporting the stack of gas generant.

11. The inflator of claim 10, wherein the flow inhibiting means comprises a tube having a hollow stem and a flange.

12. The inflator of claim 11, wherein the means for generating an ignition gas comprises an igniter disposed in the gas generant chamber for igniting the stack of gas generant, wherein upon assembly of the inflator an end of the igniter is disposed within the stem of the tube and the stem is positioned within the spacer.

13. The inflator of claim 12, wherein the spacer is supported on the flange of the tube.

14. The inflator of claim 2, further comprising a filter positioned between the housing and the stack of gas generant in the gas generant chamber.

15. The inflator of claim 14, further comprising a barrier extending into the region of the supporting means between the stack of gas generant and the supporting means for further preventing the ignition gas from entering the region of the supporting means.

16. The inflator of claim 15, wherein the barrier is a layer of high temperature resistant material.

17. An inflator of a vehicle safety restraint system having a flow inhibitor system which forces ignition gases through a gas generant of the inflator, comprising:

a housing having a gas generant chamber;

an igniter for generating an ignition gas located in the housing;

a gas generant disposed within the gas generant chamber for generating an inflation gas;

a shock absorber for supporting the gas generant, the shock absorber being disposed within a region of the gas generant chamber; and means for inhibiting the flow of the ignition gas into the region of the shock absorber, wherein the inhibiting means is disposed above the shock absorber, such that the ignition gas is prevented from entering the region of the shock absorber but passes solely through the gas generant.

* * * * *